April 24, 1962 W. C. BADDERS 3,030,769
RAMJET VARIABLE AREA EXIT NOZZLE
Filed Feb. 25, 1953 2 Sheets-Sheet 1
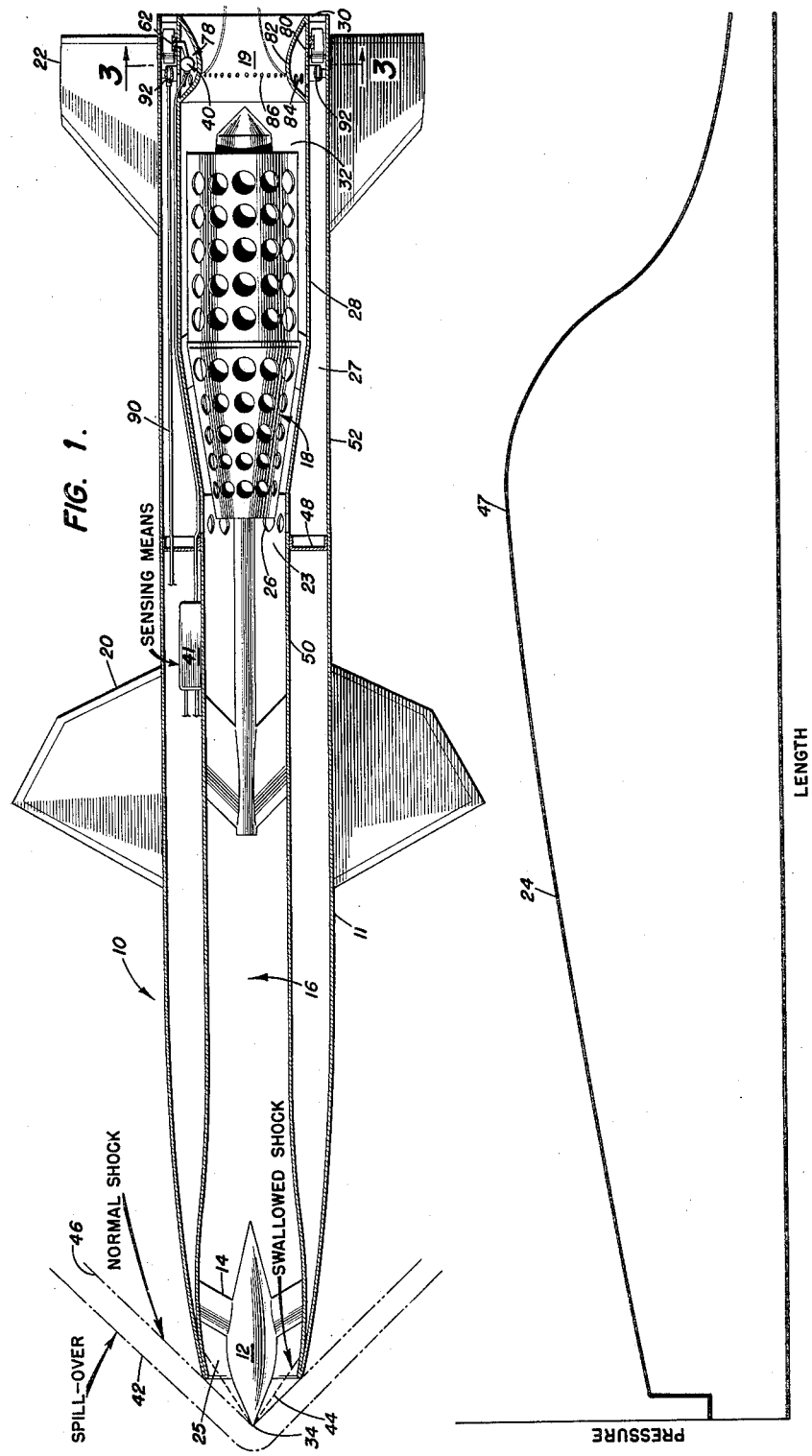

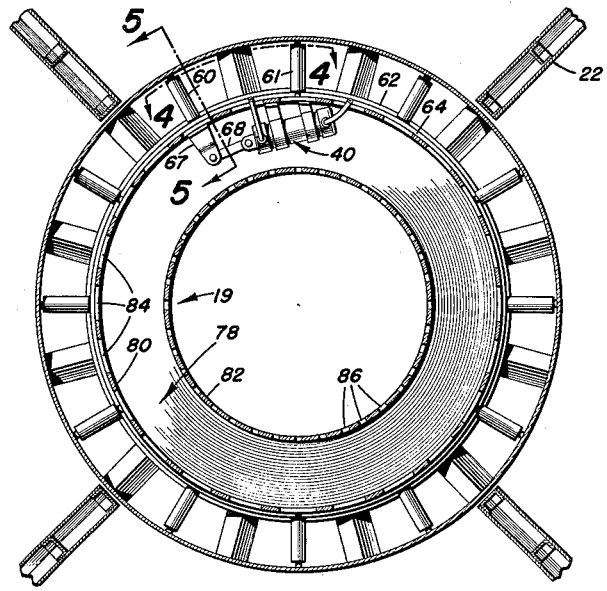
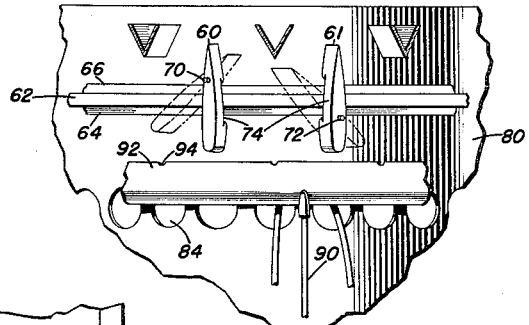
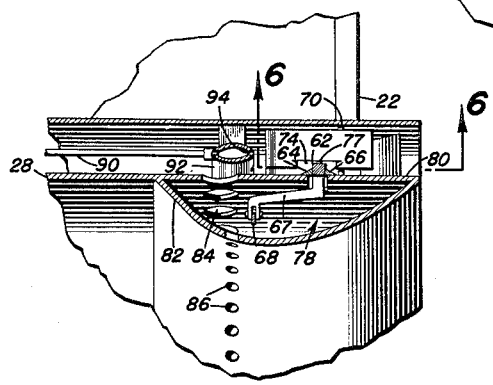
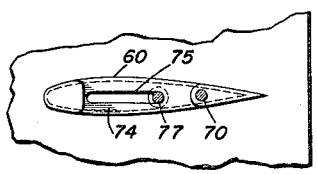

United States Patent Office 3,030,769
Patented Apr. 24, 1962

3,030,769
RAMJET VARIABLE AREA EXIT NOZZLE
William C. Badders, Takoma Park, Md., assignor to the United States of America as represented by the Secretary of the Navy
Filed Feb. 25, 1953, Ser. No. 338,746
4 Claims. (Cl. 60—35.6)

This invention relates, in general, to aerial missiles or vehicles of the ramjet type or the like, and more particularly to an arrangement for varying the throat area of an exit nozzle in a ramjet engine.

In the operation of a ramjet engine or the like, it is known that in order to obtain the maximum performance of the ramjet engine, the shock wave must be positioned so that the complete system will operate at peak points of efficiency. For example, if the shock wave at the diffuser inlet is in any other position than the design position, the mass flow of air and pressure recovery thereof through the ramjet engine will vary.

Conventionally, in order to prevent these conditions from occurring, the fuel flow has been metered in a manner to maintain the proper shock wave position. This can be done if a constant velocity of flight of a ramjet missile is maintained along a trajectory. However, in active use, a ramjet missile is maneuvered along more than one trajectory to a target, and the thrust must be adjusted to compensate for the reduction in forward velocity caused by a particular maneuver.

It is one of the objects of this invention, therefore, to provide an arrangement for varying the throat area of the exit nozzle in a ramjet missile or engine which can be utilized to give satisfactory performance and efficiency over a considerable range of flight speeds, and which also provides a wide range of thrust coefficients.

Another object of the invention is to provide an arrangement for varying the throat area of an exit nozzle in a ramjet engine, which, at the same time, provides a means for controlling the position of a shock wave at the diffuser inlet.

Still another object of the invention is to provide a nozzle arrangement for controlling the throat area at the combustor exit of a ramjet engine in order to match this area to the pressure, mass flow of air, and the temperature available at the combustor exit.

Even still another object of the invention is to provide an arrangement for controlling the shock wave at the diffuser inlet so that the mass flow and pressure recovery through the ramjet missile will remain practically uniform for varying flight conditions.

Another object of the invention is to provide an arrangement for varying the throat area of the exit nozzle of a ramjet engine which is simple in structure, easy and economical to manufacture, and efficient in operation.

Still another object of the invention is to provide other after-burning or outer burner means for developing additional thrust for the ramjet missile as it goes through its various maneuvers.

These and other objects of the invention will be apparent from the following description, taken in conjunction with the accompanying drawings, forming a part of this application, and in which:

FIG. 1 is a longitudinal sectional view of a ramjet missile, embodying the features of the invention;

FIG. 2 is a pressure curve showing how the pressure varies with the mass flow of air and gases in the ramjet engine or missile illustrated in FIG. 1;

FIG. 3 is a sectional view taken along line 3—3 of FIG. 1;

FIG. 4 is a sectional view taken along the line 4—4 of FIG. 3;

FIG. 5 is a sectional view taken along line 5—5 of FIG. 3; and

FIG. 6 is a sectional view taken along line 6—6 of FIG. 5.

In accordance with the invention, an aerial missile of the ramjet type or the like, is provided with an arrangement for varying the area of the exit nozzle at the combustor end of the missile. This arrangement comprises means for tapping a portion of the air mass from the main air-stream flowing through the diffuser of the missile; or the air can be tapped externally of the missile by means of a suitable arrangement, such as a scoop diffuser. A passageway is provided for conducting the tapped air mass to an annular chamber surrounding the exit nozzle. In addition, nozzle means are also provided for introducing the tapped air mass back into the main gas-stream.

The nozzle means comprises a plurality of apertures arranged around the periphery of the combustor exit nozzle through which passes the main gas-stream liberated from the burning of the air-fuel mixture in the combustor. Due to the high velocity of the tapped air mass flowing through the apertures in a direction substantially perpendicular to the main gas-stream, the main gas-stream at the exit nozzle is reduced in cross-sectional area. The amount that the cross-sectional area of the main gas-stream is reduced will depend upon the thrust forces that are to be developed for moving the missile along a trajectory or trajectories. After-burning means are also provided for developing additional thrust forces to supplement the main thrust forces developed by the passing of the gases liberated by the burning of the air-fuel mixture in the combustor through the exit nozzle of the aerial missile.

Referring now to the drawings, there is illustrated in FIG. 1 an aerial missile 10 of the ramjet type, or the like, having an outer body 11, and an inner body 12 which is located at the forward end of the outer body. The inner body 12 is supported by the outer body 11 by means of struts 14. This missile also has a diffuser section 16 and a combustor section 18. At the rear end of the combustor section 18, there is provided an exit nozzle section 19 of fixed cross-sectional area through which the hot gases, liberated by the burning of the air-fuel mixture, escape. The aerial missile 10 also has a plurality of wings 20 and tailfins 22 for stabilizing the missile while in aerial flight along a trajectory.

It has been found that as the air passes through the diffuser 16 of the ramjet missile 10, the static pressure is increased as indicated by curve 24 in FIG. 2. If the inlet opening 25 of the diffuser 16 is increased to give a surplus of air to complete the combustion process of the air-fuel mixture in the combustor 18, this excess air can then be bled from the exit 23 of the diffuser 16 and away from the combustor 18, through a series of apertures, such as 26, into an annular passageway 27 surrounding the ramjet's tailpipe 28. This air can be subsequently used to cool the ramjet's tailpipe 28, and can then either be dumped overboard through the aft end 30 of annular passageway 27, or be diverted back through the fixed exit nozzle 19 again into the combustor's main gas-stream 32. Although the invention is described as taking the tapped air from the air-stream flowing through the diffuser 16, it is to be particularly emphasized that the tapped air may be obtained externally of the missile by using a suitable arrangement, such as a scoop diffuser or the like.

By injecting the excess air into the main gas-stream 32, the air-flow through the ramjet engine is restricted because the excess air is used to reduce the effective area of the combustor exit nozzle 19, and, at the same time, control the position of the shock wave on the nose 34 of the inner body 12 at the diffuser inlet 25.

By utilizing the pressure differential between the diffuser inlet 25 and the diffuser outlet 23, or the pressure differential between two critical points along the diffuser 16, or by using the static and impact pressures at two critical points along the diffuser 16, the gas-stream passed through the fixed nozzle exit section or arrangement 19 can be controlled. A hydraulically-operated arrangement 40, shown in FIGS. 1 and 3, which is responsive to a sensing means 41 actuated by the above-mentioned pressure differential between two critical points along the diffuser 16, can be utilized, for example, to control the air-flow to the exit nozzle 19. Thus, by controlling the amount of air flowing through the ramjet missile 10, it is possible to adjust a spill-over shock wave 42 or a swallowed shock wave 44 back to a normal oblique shock wave 46 at the forward portion 34 of the inner body 12, and thus have the diffuser 16, and, consequently, the aerial missile 10 operate at maximum efficiency.

The structural arrangement for doing the above is shown generally in FIG. 1, and in more detail in FIGS. 3 through 6 of the drawings. It is to be pointed out, however, that an electronically-operated or mechanically-operated arrangement (neither of which is shown) could be used to control the flow of excess air to the exit nozzle 19, and that this invention is not to be limited to the hydraulically-operated arrangement 40 which is illustrated. It is to be noted further that when either a hydraulically-operated arrangement 40 or an electronically-operated or mechanically-operated arrangement is used to control the air-flow, sensing means 41 can be arranged to operate as a function of the required missile thrust or Mach number.

Air is taken into the diffuser 16 through the diffuser inlet 25. As the air passes through the diffuser 16, the pressure thereof builds up to a maximum as indicated by numeral 47, shown in FIG. 2, substantially at the outlet end 23 of the diffuser 16. A portion of the main air-flow is tapped off through the apertures 26 near the diffuser outlet 23. An annular ring 48 located between the inner wall 50 and the outer wall 52 of the outer body 11 prevents the tapped air mass from passing back into the forward portion of the missile 10. The tapped air mass passes through the annular passageway 27 toward the exit nozzle 19.

The quantity of tapped air that is returned to the main gas-stream 32 that passes through the exit nozzle 19 will depend upon the position of two series of vane-like elements 60 and 61, the positions of which are determined by an annular ring 62, all of which are shown best in FIGS. 4 and 5. The annular ring 62 is mounted for movement between two track-like elements 64 and 66 which extend completely around the tailpipe 28 of the missile 10. The annular ring 62 is connected through a push-pull arm 67 and a suitable mechanical linkage 68 to the hydraulically-operated arrangement 40. By means of this arrangement, the annular ring 62 can be made to oscillate about the missile axis.

The vane-like elements 60 and 61 are mounted for pivotal movement by means of pins 70 and 72 extending between the tailpipe 28 and outer wall 52, respectively, of the aerial missile 10. Each vane-like element 60 or 61, in each series, has two slots provided therein. The first slot 74 is provided so that the vane-like elements 60 or 61 will be able to properly clear the movable annular ring 62. A second slot 75 is also provided in each vane-like element 60 and 61, the purpose of which will now be described. A pin 77 for each element 60 or 61 is provided for moving these elements 60 and 61 when the ring 62 is rotated or oscillated. One end of each pin 77 is integrally attached to the ring 62, and the other end is free to move in the slot 75. Thus, when ring 62 is rotated or oscillated, the free ends of pins 77 move in slots 75 and thus move the vane-like elements 60 and 61 in the required directions.

It is to be noted that the series of vane-like elements 60 will move in a direction contra to the direction of movement of vane-like elements 61, so that each two vane-like elements 60 and 61 will either present a maximum or a minimum opening for the tapped air to pass therethrough into the aft section 30 of the passageway 27.

The tapped air that passes through passageway 27 is first introduced into an annular chamber 78 surrounding the exit nozzle 19. This annular chamber 78 is defined by a portion 80 of the tailpipe 28 and the annular wall 82 of the exit nozzle 19. This tapped air passes into this annular chamber 78 through a plurality of apertures or openings 84 which are provided in the tailpipe 28. The tapped air introduced in the annular chamber 78 then passes through a second plurality of nozzle-like apertures 86, provided in the periphery and near the throat of the exit nozzle 19, and into the main gas-stream 32.

It is to be noted that this tapped air mass is introduced into the main gas-stream 32 in a direction substantially perpendicular to that of the direction of flow of stream 32. Due to the velocity of the air jets passing into the main gas-stream, the latter is substantially reduced in cross-sectional area. The amount of reduction of the cross-sectional area of the main gas-stream 32 passing through the exit nozzle 19 will depend upon the velocity of the tapped air passing through the apertures 86 into the main gas-stream. By thus controlling the quantity and thus the velocity of the air passing through apertures 86, it is possible to control the effective cross-sectional area of the throat of the exit nozzle 19. As previously pointed out, this is achieved by controlling the positions of the series of vane-like elements 60 and 61.

In order to develop additional thrust for the propulsion of the aerial missile 10, an after-burning arrangement has been provided. This comprises a fuel line 90 extending from a fuel tank, not shown, to an annular, hollow ring or manifold 92. A plurality of apertures 94 are provided in the down-stream end of the ring for the fuel to escape into the tapped air-stream that is being dumped overboard through passageway 30. The air-fuel mixture in the aft portion 30 of passageway 27 is ignited by suitable means or through self-ignition due to the hot gases escaping through the main exit nozzle 19. The gases liberated from the burning of this air-fuel mixture are utilized to develop additional thrust for propelling the missile 10.

As previously pointed out, it is possible to control the position of the shock wave, that is, adjust it from a spill-over position 42 to a normal oblique position 46, or from a swallowed position 44 to its normal oblique position 46, by controlling the mass flow of the gas-stream passing through the exit nozzle 19, or the internal pressure level in the diffuser 16 to obtain the desired performance characteristic of the ramjet missile 10 as it is deviated from its normal flight Mach number or as the thrust requirements vary due to maneuvering from one trajectory to another.

In actual operation, the areal missile 10 is launched by a suitable booster (not shown). After the boost period, the booster separates from the aerial missile 10, and the latter continues along the required trajectory under its own source of power which is generated by the burning of the air-fuel mixture in the combustor 18 and the escaping of the liberated gases therefrom through the exit nozzle section or arrangement 19.

A portion of the air passing through the diffuser 16 is bled off through the plurality of apertures 26 at the diffuser exit 23. This tapped air from diffuser 16 passes through the passageway 27 and is introduced into the chamber 78 surrounding the exit nozzle arrangement 19. The tapped air passes through the plurality of apertures 86 and is introduced into the main gas-stream 32. The tapped air, passing through the apertures 86 due to the velocity thereof, has the effect of reducing the effective cross-sectional area of the exit nozzle section or arrangement 19 at the throat thereof by contracting the main gas-stream 32.

The hydraulically-operated arrangement 40, controlled by the sensing means 41, is utilized to control the series of vane-like elements 60 and 61, which, in turn, control the amount of tapped air that is to be injected into the gas-stream 32 passing through the exit nozzle 19. The hydraulically-operated arrangement 40 is sensitive to the pressure differential between the inlet 25 and the outlet 23 of the diffuser 16, or a pressure differential between two critical points along the diffuser 16. The static and impact pressures at any two critical points along or in the diffuser 16 can also be utilized to control the hydraulically-operated arrangement 40. Thus by controlling the amount of excess air injected into the gas-stream 32, it is possible to adjust the position of the spill-over shock wave 42, or a swallowed shock wave 44, to a normal oblique shock wave 46, and thus operate the diffuser 16 at a point of maximum efficiency.

A fuel meter or the like, also sensitive to the pressure differential between any two critical points along the diffuser 16, or to the static and impact pressures of the airstream flowing through the diffuser 16, passes fuel through fuel line 90 to the after-burning or outer burner arrangement 92. The fuel is injected into the air-stream in passageway 27, and the air-fuel mixture is ignited by suitable means or by self-ignition due to the hot gases escaping through the exit nozzle arrangement 19. This arrangement provides thrust to supplement the main thrust developed by the expansion of the gas-stream 32 through the exit nozzle arrangement 19.

Obviously many modifications and variations of the present invention are possible in the light of the above teachings. It is therefore to be understood that within the scope of the appended claims the invention may be practiced otherwise than as specifically described.

What is claimed is:

1. A variable area nozzle arrangement for use in an aerial vehicle of the ramjet type having a duct, comprising, a fixed exit nozzle in said duct, means for tapping a portion of the air medium flowing through said duct, an annular chamber surrounding said exit nozzle, a passageway for conducting said tapped medium to said annular chamber, means for introducing said tapped medium back into said medium stream passing through said exit nozzle, sensing means arranged to operate as a function of static and impact pressures, said sensing means including a device sensitive to changes in impact and static pressure determined at two points along said duct of said aerial vehicle, and means responsive to said sensing means for controlling the amount of said tapped medium introduced back into said medium stream, whereby when said pressures of said aerial vehicle change, said sensing means senses said changes in pressures and actuates said control means to control the amount of tapped medium that is to be introduced back into said main medium stream, thereby adjusting for changes in thrust of said aerial vehicle.

2. An arrangement as set forth in claim 1, wherein said control means includes a plurality of aerial vanes, said vanes being actuated by a hydraulic system controlled by said sensing means.

3. An arrangement as set forth in claim 2, wherein said means for tapping a portion of the medium flowing through said duct comprises a plurality of apertures provided in said wall in said duct of said aerial missile.

4. A variable area nozzle arrangement for use in an aerial vehicle of the ramjet type having a duct, comprising, a fixed exit nozzle in said duct, means for tapping a portion of the air medium flowing through said duct, an annular chamber surrounding said exit nozzle, a passageway for conducting said tapped medium to said annular chamber, means for introducing said tapped medium back into said medium stream passing through said exit nozzle, sensing means arranged to operate as a function of static and impact pressures, means responsive to said sensing means for controlling the amount of said tapped medium introduced back into said medium stream, whereby when said pressures of said aerial vehicle change, said sensing means senses said changes in pressures and actuates said control means to control the amount of tapped medium that is to be introduced back into said medium stream, thereby adjusting for changes in thrust of said aerial vehicle, and means for developing additional thrust from the tapped medium by the injection of fuel therein and the burning of said air-fuel mixture.

References Cited in the file of this patent

UNITED STATES PATENTS

| | | |
|---|---|---|
| 2,464,724 | Sedille | Mar. 15, 1949 |
| 2,540,594 | Price | Feb. 6, 1951 |
| 2,630,673 | Woll | Mar. 10, 1953 |
| 2,648,192 | Lee | Aug. 11, 1953 |
| 2,651,172 | Kennedy | Sept. 8, 1953 |
| 2,692,800 | Nichols et al. | Oct. 26, 1954 |
| 2,780,424 | Price | Feb. 5, 1957 |
| 2,943,821 | Wetherbee | July 5, 1960 |

FOREIGN PATENTS

| | | |
|---|---|---|
| 130,392 | Sweden | Dec. 19, 1950 |